No. 771,243.

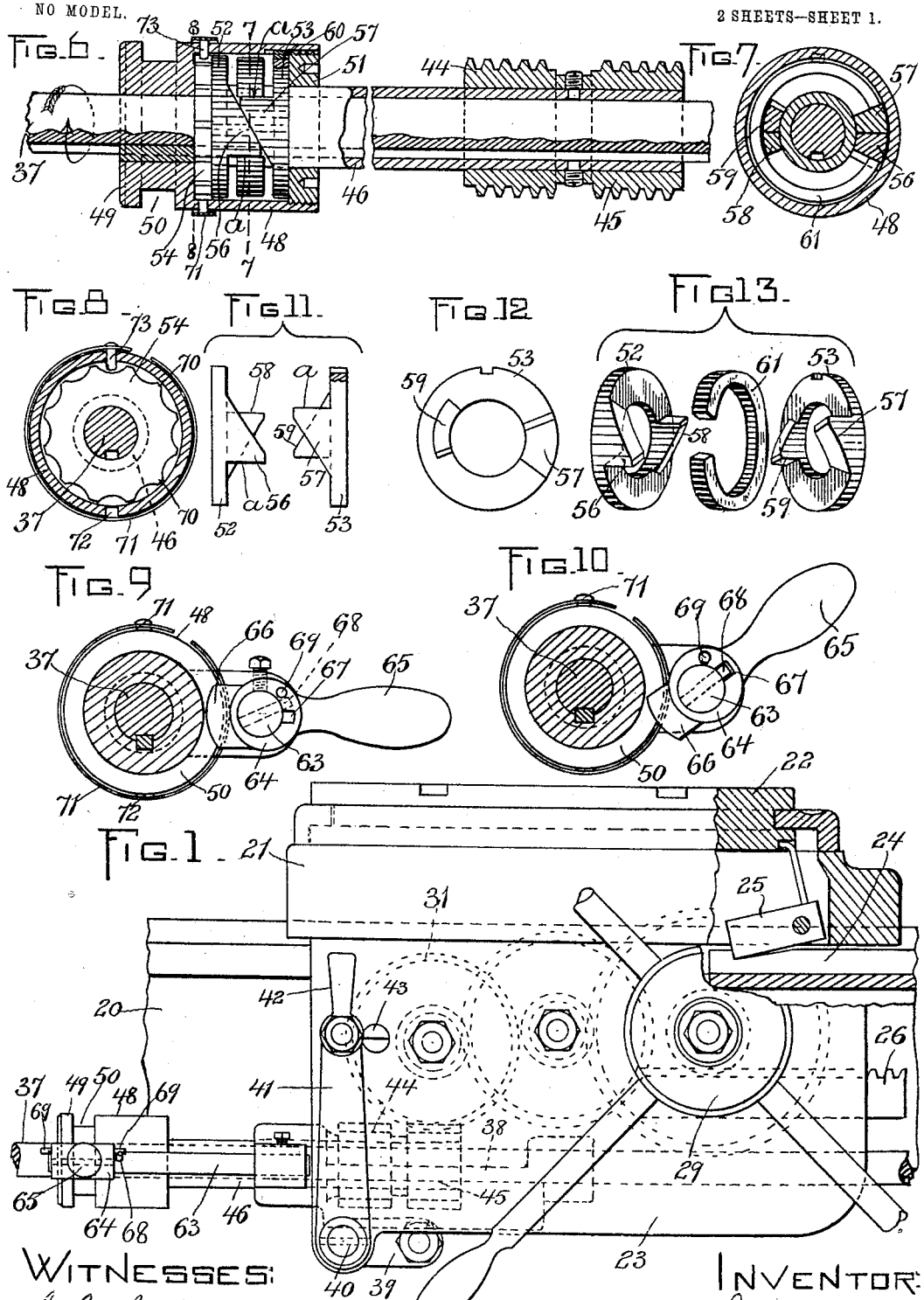

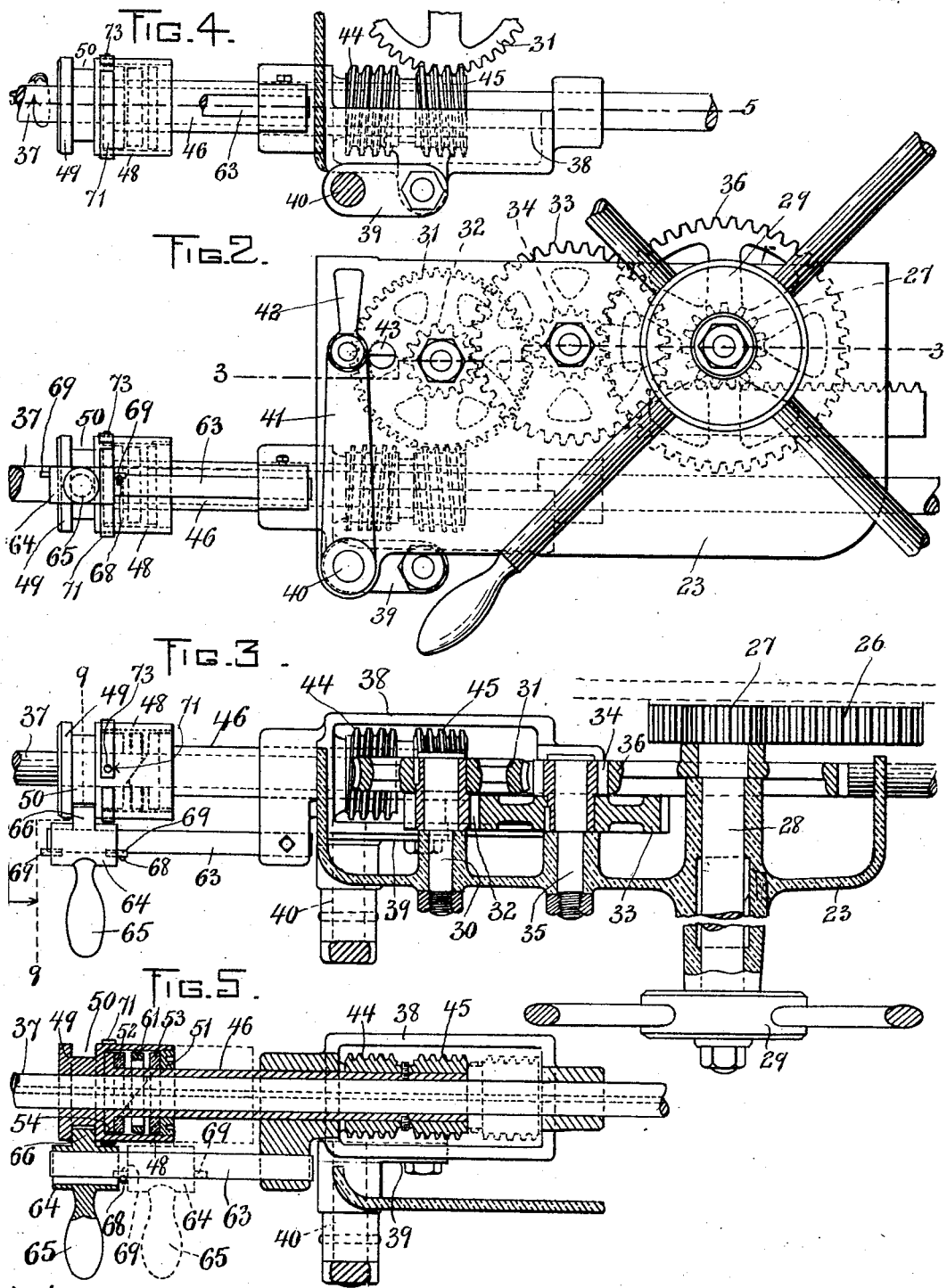

Patented October 4, 1904.

UNITED STATES PATENT OFFICE.

JAMES HARTNESS, OF SPRINGFIELD, VERMONT.

LATHE.

SPECIFICATION forming part of Letters Patent No. 771,243, dated October 4, 1904.

Application filed January 21, 1903. Serial No. 139,892. (No model.)

*To all whom it may concern:*

Be it known that I, JAMES HARTNESS, of Springfield, in the county of Windsor and State of Vermont, have invented certain new and useful Improvements in Lathes, of which the following is a specification.

This invention has relation to lathes, and more particularly to mechanism for moving the carriage or tool-holder thereof.

It has been heretofore proposed to employ a lead-screw driven by a gear and a friction device coacting with the gear, so that the breakage of the gears of the lathe might be prevented in case the carriage accidentally engaged some positive stop; but on account of the uncertainty of the device it has never been used to any extent, for when it was strong enough to move the carriage with the maximum pressure it was unreliable in yielding within safe limits.

In a prior application, Serial No. 126,517, filed October 9, 1902, there is set forth a lathe having a carriage-feeding mechanism in which the thrust of one member longitudinally of its axis against the complemental member to which it is temporarily locked is measured or determined by a suitable tension device, so that the carriage is fed forward until positively arrested, whereupon the two members are separated on lines longitudinal of their axes to unlock them.

According to the present invention, however, a tension device is employed for insuring a predetermined torque or torsional thrust delivered from one rotary driving member to the member driven thereby—that is to say, there is placed in the carriage-moving mechanism a torque-controlling tension device which may be so regulated as to effect the driving of the carriage until the resistance to its movement exceeds a predetermined pressure. The torsional thrust delivered from the driving member to the driven member is sufficient to feed the carriage accurately and evenly, and yet to yield before a breaking strain is reached in the event of the carriage being stopped in its movement.

Preferably in connection with the carriage there are employed one or more adjustable stops for checking the advance or receding movement of the carriage, and the carriage may therefore be fed positively against a stop and held thereagainst with a fixed pressure to hold the tool against the shoulder on the work until disengaged therefrom by the operator.

In addition to the features thus briefly referred to the invention includes others of more or less importance, which are illustrated upon the drawings, described in the specification, and pointed out in the accompanying claims.

On the drawings, Figure 1 represents a portion of a lathe and illustrates the bed, the carriage with the turret thereon, the positive stop for the carriage, and the improved mechanism for moving the carriage. Fig. 2 represents a similar view, except that the bed, the turret, and the carriage, with the exception of the apron, are removed and the gearing is shown more in detail. Fig. 3 represents a section on the line 3 3 of Fig. 2. Fig. 4 represents a front elevation of a portion of the driving mechanism with the apron broken away to illustrate the worm-box. Fig. 5 represents a section on the line 5 5 of Fig. 4. Fig. 6 represents a longitudinal section through the feed-shaft. Fig. 7 represents a section on the line 7 7 of Fig. 6. Fig. 8 represents a section on the line 8 8 of Fig. 6. Figs. 9 and 10 represent sections on the line 9 9 of Fig. 3, the parts being enlarged and showing the handle in different positions. Figs. 11 and 12 represent the coacting cams in detail. Fig. 13 represents in perspective view the cams and the tension-spring.

On the drawings, 20 indicates the bed of the lathe, upon which the carriage 21 is adapted to slide. This carriage carries the flat turret 22 and is provided with the usual apron 23. In the bed of the lathe are placed the adjustable stop-bars, one of which is indicated at 24, with which coact the dogs 25, mounted on the carriage and permitted to drop automatically into operative position by the turret, as set forth in my Letters Patent No. 457,967, dated October 18, 1891. To the bed is secured the usual rack-bar 26, with which is engaged the pinion 27 on the shaft 28, journaled in bearings on the apron 23, with the usual hand-wheel 29 fastened upon the forwardly-projecting end of this shaft for the purpose of moving the carriage manually toward and from the work, the advance movement of the carriage being to the left in Fig. 1 and the receding movement to the right. Secured in the apron is a stud-shaft 30, on which are journaled the worm-wheel 31 and the pinion 32, said worm-wheel and said pinion being rigidly connected to rotate together. The pinion 32 is operatively connected to the shaft 28 through the medium of the gear 33 and pinion 34 on the intermediate shaft 35 and a gear 36 on the shaft 28. The worm-wheel 31 has its teeth so cut or formed that it may intermesh with both a right and a left worm, being in this respect similar to the worm-wheel illustrated, and described in my copending application, Serial No. 126,517, filed October 9, 1902.

The feed-shaft is indicated at 37, and it is arranged longitudinally of the bed, being positively driven at one end by mechanism or gearing. (Not shown.) This feed-shaft is journaled in bearings afforded by a worm-box 38, supported in the end of an arm 39 on a rock-shaft 40, extending forwardly in a horizontal direction and journaled in a bearing on the apron 23. The rock-shaft 40 is likewise provided with an arm 41 at right angles to that at 39. The upper end of the arm 41 is provided with a locking-handle 42, equipped with a semicylindrical latch to engage a semicylindrical catch or stop 43 on the apron. The lever or arm 41 may be moved to upright position and the handle 42 rocked so that its latch will engage the catch or stop 43 to maintain the worm-box in raised position. Upon the operator swinging the handle 42 about its pivot the latch may be disengaged from the catch to permit the worm-box to drop and disengage the driving-worm upon the worm-wheel 31. A double worm is preferably provided, and its threads are cut oppositely, so that the carriage may be fed in one direction or the other, according to the particular worm that is engaged with the worm-wheel. This element is termed a "double" worm; but it will be understood that the worm may be formed in two separate parts, rigidly connected together, either directly or indirectly. The two worms 44 45 or the two parts of the double worm are longitudinally movable in the worm-box to permit either of them to be engaged with the worm-wheel, as indicated in Fig. 5. They are rigidly secured to a sleeve 46, which is placed loosely upon the feed-shaft 37. By mechanism which will be subsequently explained this sleeve is frictionally connected to the shaft 37 and is capable of longitudinal movement thereon for the purpose of shifting the worms. Keyed on the shaft 37 is a head which contains within it the friction device. This head is formed with a casing 48 and a grooved end 49. The circumferential groove 50 is provided for a purpose to be explained. The end of the casing 48 is internally threaded to receive a lock-nut 51. Between this lock-nut and the end 49 of the head there are placed two cam members 52 53. The end of the sleeve 46 extends into the head and is provided with a flange 54, which lies between the cam member 52 and the end 49 of the head.

The two cam members 52 53 are complemental, each being provided in the shape of a collar with cam projections 56 57 58 59, which are respectively engaged, as shown in Fig. 6. The member 53 is provided in its periphery with a slot to receive a key 60, by which it is positively connected to the driving-head. The member 52, however, is loose both with relation to the sleeve 46 and the driving-head. The cam projections 56 57 are formed with shoulders $a\ a$, and a spring 61 is arranged between the members 52 53, with its ends bearing against the shoulders $a\ a$, as illustrated in Fig. 6. The cam projections 58 59 are cut away to permit the location of the spring in the position as shown in Fig. 7, and said cams operate to assist in holding it in place. The tendency of the spring 61 is to contract, and consequently to wedge the cams 57 59 and the cams 56 58 in the opposite direction, so as to move the members 52 53 longitudinally of the shaft 37. This longitudinal movement of the cams clamps the flange 54 on the sleeve 46 tightly between the member 52 and the head 49, so as to bind the shaft 37 and the sleeve 46 frictionally together. The tension of the spring may be adjusted by means of the nut 51. By screwing the nut inward the member 53 is wedged toward the member 52, so as to expand the spring and increase the tension, whereas the adjustment of the nut in the opposite direction tends to permit the contraction of the spring and a decrease in its pressure upon the members 56 57. It would be natural to suppose, in view of the fact that the shaft 37 rotates in the direction of the arrow in Figs. 4 and 6, that these cams might separate; but this is not the fact, for, on the contrary, the cams are wedged past each other by the tension of the spring, and there is no pull or force transmitted from the head or the shaft 37 to the worm-sleeve or worms thereon except that which is determined by the spring. This spring operating on the cam members tends, as previously stated, to move the worm-sleeve toward and tightly clamp it frictionally to the head on the shaft 37, and hence the rotation of the shaft 37 will be transmitted through the rack mechanism to advance the carriage until it meets with a fixed resistance, after which the worm-sleeve will be disconnected from the shaft 37 by a slight movement of the worm-sleeve away from and its slippage relatively to the head. The head is connected to the carriage so as to move therewith longitudinally of the feed-shaft; but it is also movable with relation to the carriage for the purpose of shifting the double worm relatively to the worm-wheel.

In Fig. 5 it will be seen that secured to a forwardly-extending projection on the worm-box is a guide-rod 63, arranged in parallelism with the shaft 37. On this shaft is the sleeve 64, having a handle 65 and also having a finger 66 extending into the groove 50 of the head. The sleeve 64 has a groove or slot 67, which may be brought by the rotation of the handle into alinement with a pin 68 in the guide-rod 63 to permit the movement of the sleeve and handle on said rod. The handle 65 normally remains in the position shown in Fig. 9, inasmuch as the sleeve 64 is provided at each end with a pin 69, which is supported by the pin 68. When the handle is in this position, the friction-head and the double worm are held rigidly against longitudinal movement relatively to the carriage. By rocking the handle to the position shown in Fig. 10, so as to bring the groove or slot 67 in alinement with the pin 68, the sleeve may be moved on the guide-rod 63, so as to shift the double worm in one direction or the other, after which the handle may be again dropped to permit one of the pins 69 to rest upon the pin 68. In addition to the devices thus described there is a contrivance for sounding an alarm when the shaft 37 rotates relatively to the worm-sleeve, as when the movement of the carriage is arrested by the positive stop.

In Fig. 8 the flange 54 on the sleeve 46 is provided in its periphery with a plurality of teeth 70. A circular spring 71 encircles the casing 48 and is held in place by pins 72 73, extending into said casing. The pin 73 is secured on the end of the spring and is adapted to play loosely in the aperture in which it is inserted and also to bear against the teeth 70. When the head rotates relatively to the sleeve, the noise made by the pin engaging the teeth 70 is sufficient for the operator to hear it, and thus become cognizant of the relative rotative movement of the worms and feed-shaft.

It is unnecessary to reiterate the operation of the mechanism described more than to state that to advance the carriage the double worm is shifted to proper position and to engage with the worm-wheel, the latch connected to the handle 42 being connected to the stop or catch 43. The advance of the carriage will thereafter be constant until one of the dogs 25 engages a shoulder on the stop-bar 24, upon which the further movement of the carriage will be arrested, and the friction-head will permit the shaft 37 to rotate relatively to the double worm. The operator may then withdraw the tool from the work and drop the latch, so as to disengage the worm from the worm-wheel.

One of the most important features of this invention is the means by which a given torque is delivered. The tension of the spring is set to any predetermined degree, so that the carriage may be fed practically positively, so that the work accomplished by the tools will be perfect, as in using chasers for threading the work, and yet upon the positive arrest of the carriage the friction mechanism will permit the continued rotation of the shaft 37 without effecting the rotation of the worm or breaking any of the parts directly or indirectly connected thereto.

Having thus explained the nature of the invention and described a way of constructing and using the same, although without attempting to set forth all of the forms in which it may be made or all of the modes of its use, I declare that what I claim is—

1. In a lathe, a bed, a carriage movable thereon, and carriage-moving mechanism comprising a feed-shaft arranged substantially in parallelism with the path of travel of the carriage, two rotary members, one connected to the feed-shaft, and the other connected to the carriage, and a torque-determining device interposed between said rotary members and arranged to impart a predetermined yielding torque from one member to the other whereby the driven member is arrested by not less than a predetermined resistance.

2. In a metal-working machine, a carriage, and carriage-moving mechanism including a feed-shaft, two rotary members one slidingly connected to said shaft but rotatable therewith, and the other connected to the carrier and movable therewith, and a torque-determining spring for holding said members in frictional engagement and arranged to permit said members to separate with a consequent slippage of said members upon the arrest of the driven member.

3. In a metal-working machine, a carriage, and mechanism for moving said carriage, including a feed-shaft, devices actuated thereby and movable with the carriage, and torque-determining means interposed between said feed-shaft and said devices, whereby the movement of said carriage and said devices may be arrested by not less than a predetermined resistance.

4. A metal-working machine comprising a carriage, a feed-shaft, carriage-moving gearing yieldingly connected to the said shaft and movable with the carriage, and means for determining the torque delivered from the driver to said gearing, whereby said means will not permit the gearing to be arrested at less than a predetermined resistance.

5. A metal-working machine comprising a carriage, and mechanical means for moving the carriage, including a feed-shaft, separable friction members, and tension devices placed under increased tension by the arrest of the carriage to separate said members, and thereby permit one to slip relatively to the other.

6. A lathe comprising a carriage, a positively-driven feed-shaft, arranged longitudinally of the lines of movement of said carriage, carriage-moving gearing, and operative connections between said carriage and said shaft including friction members, movable in unison, a C-spring for holding said members together, and means whereby increased tension on said spring effects a separation of said members.

7. A lathe comprising a carriage, a positively-driven feed-shaft, carriage-moving gearing, and operative connections between said carriage and said shaft including spring-tensioned devices movable with the carriage and adapted to transmit a predetermined yielding force to move the carriage, and means for varying the tension to permit the mechanism to yield to a greater or less resistance.

8. A lathe comprising a carriage, a positively-driven feed-shaft, carriage-moving gearing, and operative connections between said carriage and said shaft including a C-spring receiving power at one end from the shaft, a friction member to which power is imparted by the other end of the spring, and a complemental friction member having a carriage-moving gear connected thereto, in consequence of which the carriage is moved with a predetermined yielding pressure.

9. A lathe comprising a carriage, a feed-shaft, a bed having a positive stop, and mechanical carriage-moving mechanism actuated by said feed-shaft and including friction devices slidingly keyed on said shaft and connected to said carriage to move therewith, and a C-spring interposed between the shaft and the friction device which is connected to the carriage.

10. A lathe comprising a carriage, a feed-shaft, carriage-moving gearing, including a worm and worm-wheel mounted on said carriage, and a spring-tension device interposed between the worm and shaft and arranged to impart a predetermined yielding torque from the shaft to the worm.

11. A lathe having a carriage, carriage-moving mechanism comprising a worm, and a worm-wheel carried by said carriage, a feed-shaft, and a spring-tensioned device connecting the worm and shaft, and movable longitudinally on said shaft, said device imparting a predetermined yielding torque from the feed-shaft to said worm.

12. A lathe having carriage-moving mechanism comprising a feed-shaft, a gear, cam members having a wedging relation and having means for frictionally connecting the gear to the shaft, and a spring for yieldingly holding the members in interwedged relation.

13. A lathe having carriage-moving mechanism comprising a shaft, a sleeve thereon having a flange or collar, a head on said shaft inclosing said collar, a member frictionally clamping said flange or collar against the end of said head, and a spring bearing against said member.

14. A lathe having a feed-shaft, a worm, a sleeve for said worm, and friction mechanism for connecting the sleeve to the shaft comprising a fixed member, a rotatory longitudinally-movable member, a flange or collar on said sleeve, a casing carrying said fixed member and inclosing the flange or collar and said movable member, and a spring for effecting a movement of said movable member relatively to said fixed member to clamp the flange or collar between said movable member and the casing.

15. The combination of a rotatory casing having a fixed member at one end, an annular member, a movable member for clamping the annular member between it and the end of the casing, said fixed and said movable members having complemental wedges or cams, and a spring engaging said cams or wedges for wedging the movable member into frictional engagement with the annular member.

16. The combination of a rotatory casing having a fixed member at one end, an annular member, a movable member for clamping the annular member between it and the end of the casing, said fixed and said movable members having complemental wedges or cams, a spring engaging said cams or wedges for wedging the movable member into frictional engagement with the annular member, and means for adjusting the tension of said spring.

17. A lathe comprising a carriage having an apron, a feed-shaft, a worm-wheel on the apron of said carriage, a right and left worm on the shaft adapted to engage said worm-wheel, a guide-bar on said apron, and means on said guide-bar for moving said double worm and holding it in position.

18. A lathe comprising a carriage having an apron, a feed-shaft, a worm-wheel on the apron of said carriage, a right and left worm on the shaft adapted to engage said worm-wheel, a sleeve carrying said worm, and means for moving said sleeve.

19. A lathe comprising a carriage having an apron, a feed-shaft, a worm-wheel on the apron of said carriage, a right and left worm on the shaft adapted to engage said worm-wheel, a sleeve carrying said double worm, a handle connected to said sleeve, and a guide on which said handle is movable.

20. A lathe having a carriage with an apron, a feed-shaft, a worm, a sleeve loose on said shaft and carrying said worm, a worm-wheel journaled on the apron, friction members for frictionally connecting the sleeve with the shaft, and a spring for determining the amount of resistance necessary to effect the slippage of said friction members.

21. A lathe having a carriage with an apron, a feed-shaft, a worm loose on said shaft, a worm-wheel journaled on said apron, coacting wedging friction members for frictionally connecting the worm with the shaft, and a spring for wedging said members past one another to effect the frictional engagement of said members with said worm.

22. A lathe comprising a bed provided with a positive stop, a carriage arranged to engage and be arrested by said stop, a feed-shaft, a worm loose on said shaft, carriage-moving gearing on said carriage including a worm-wheel, means for frictionally connecting the worm with said shaft to rotate therewith while freely movable longitudinally thereon, until arrested by the engagement of the carriage with the stop, and means for disconnecting the worm and worm-wheel.

In testimony whereof I have affixed my signature in presence of two witnesses.

JAMES HARTNESS.

Witnesses:
J. W. WALKER,
A. N. HOWE.